Dec. 23, 1969 R. E. CLAPP 3,486,122
DOUBLE SWITCH MULTIPLIER
Filed Jan. 17, 1967 2 Sheets-Sheet 1

INVENTOR
ROGER E. CLAPP
BY,
Kenway, Jenney & Hildreth
ATTORNEYS

DOUBLE SWITCH MULTIPLIER

Filed Jan. 17, 1967 2 Sheets-Sheet 2

INVENTOR
ROGER E. CLAPP
BY,
Kenway, Jenney & Hildreth
ATTORNEYS

United States Patent Office 3,486,122
Patented Dec. 23, 1969

3,486,122
DOUBLE SWITCH MULTIPLIER

Roger E. Clapp, 44 Coolidge Ave.,
Cambridge, Mass. 02138

Filed Jan. 17, 1967, Ser. No. 609,915
Int. Cl. G06g 7/16
U.S. Cl. 328—160 10 Claims

ABSTRACT OF THE DISCLOSURE

To generate the product of two signals, each is switched, at a first frequency, between two values that are nominally of like magnitude and opposite polarity. The switches are operated in time quadrature. The switched signals are summed, the sum is conventionally detected, and the detected sum is applied to a synchronous detector that is operated at twice the switching frequency. In consequence, errors due to departures from ideal performance of many apparatus elements are minimized. In a modification which operates in accordance with the same principles, but, in addition, conserves information, the difference between the switched signals is formed, as well as their sum. After individual conventional detection of these quantities, their difference is applied to the synchronous detector.

This invention deals with the processing of information and particularly with the multiplication together of a pair of information-bearing signals by a process of square wave modulation or switching. Its principal object is to minimize the dependency of the resulting product on the apparatus elements employed and on their departures from ideal performance.

As electronic technology is increasingly employed in the processing of information, in contrast to communication, it becomes increasingly important to generate, with all possible exactitude, the products of two or more quantities each of which is represented by, or contained in, an electrical signal. The techniques of correlation provide examples. Through autocorrelation a minute periodic signal, practically unrecognizable by itself because "buried in noise" of much greater amplitude, can be magnified, as compared with the noise, to such a point that it can be perceived, recognized, and analyzed. Similar, or closely related, advantages hold, in certain fields, for cross-correlation.

One such field is radio astronomy. An antenna-receiver system employed in radio astronomy is termed a radio telescope or a radiometer. Its function is to measure the radio frequency power radiated by a heavenly body. Generally, the incoming signal power is broadband noise, the statistical properties of which do not differ significantly from noise which may originate in the receiver apparatus itself or from unwanted background noise originating in sources not of current interest, picked up by the antenna and delivered to the receiver. The signal power level in a radio astronomy receiver is usually extremely low, e.g., of the order of $10^{-15}$ to $10^{-20}$ watts. This means that high sensitivity is one of the first requirements of the receiver, and that the emphasis of the designer must be quite other than that of the designer of a more conventional communication receiver.

In a monograph published in the IEEE Transactions on Antennas and Propagation for December 1964 (Vol. AP-12, p. 930), M. E. Tiuri has described many of the schemes that have been proposed to cope with problems that are peculiar to this field. Among such schemes are the switching receiver: one in which the receiver apparatus proper, including detectors, filters and the like, is periodically switched back and forth from the antenna to a local source of noise having similar statistical properties. In various ways an "error" signal can be developed which is representative of the difference between the incoming signal power and the power of the local noise source. This error signal can then be fed back degeneratively to control the power delivered by the local noise source until the error signal vanishes; and this means that the power delivered by the local noise source is of the same magnitude as the power picked up by the antenna. Since the local noise power can be measured (in the usual case it is exactly proportional to the anode current supplied to a "noise tube"), the incoming power has been determined, albeit indirectly.

One way in which to develop the error signal, and so to equate the local noise source power with the incoming antenna power is the following. Representing the antenna signal voltage by the complex number A and the voltage of the local noise source by the complex number B, form the sum of these voltages, $$C=A+B$$

and their difference $$D=A-B$$

This operation can be performed by a biconjugate network such as a hybrid junction or "Hybrid." The averaged product of the sum C by the difference D is evidently $$\overline{C \cdot D}=|A|^2-|B|^2$$

plus cross terms which average to zero because A and B are uncorrelated signals. Hence, to maintain the average product C·D equal to zero is equivalent to maintaining the average power of the local noise source B equal to the average power of the incoming signal A. It is thus of the highest importance that the multiplication operation be carried out with all possible accuracy.

The switching multiplier of FIG. 10 of the Tiuri monograph which, in principle, develops the product of two input signals, gives the desired result only insofar as the phase switch and the adder perform their respective functions perfectly, and almost every imperfection of these apparatus components is reflected in an incorrect magnitude of the desired product. Of course, no apparatus component, no matter what the care with which it is designed and constructed, is perfect; and hence the switching multiplier of the monograph leaves something to be desired.

The present invention stems from the recognition that, by individually switching EACH of the signals, e.g., the sum of the incoming signal and the local noise signal and their difference, by operating the two switches at the same frequency and in time quadrature, and, after certain intermediate processing has been carried out including, in particular, detection, finally combining the switched signals in a synchronous detector that is operated at exactly twice the switching frequency and in a certain phase relation with the switching operations, certain effects of departures of the performance of the appartaus elements from the ideal can be minimized and others balance out entirely.

In one embodiment of the invention the two switched signals of which the product is required are summed, the sum is conventionally detected to average the radio frequency fluctuations, and the detected sum is applied to the synchronous detector.

In a second modification, the difference between the two applied signals is formed, as well as their sum. After these have been individually detected, the difference between the detected sum and the detected difference is developed, and this second difference is applied to the synchronous detector which operates as before. The result, too, is as before, the difference being only that, by requiring that every apparatus component be usefully employed throughout all the available time, information is preserved which might otherwise be lost.

The invention will be fully apprehended from the following illustrative embodiments thereof taken in connection with the appended drawings in which.

Figure 1:
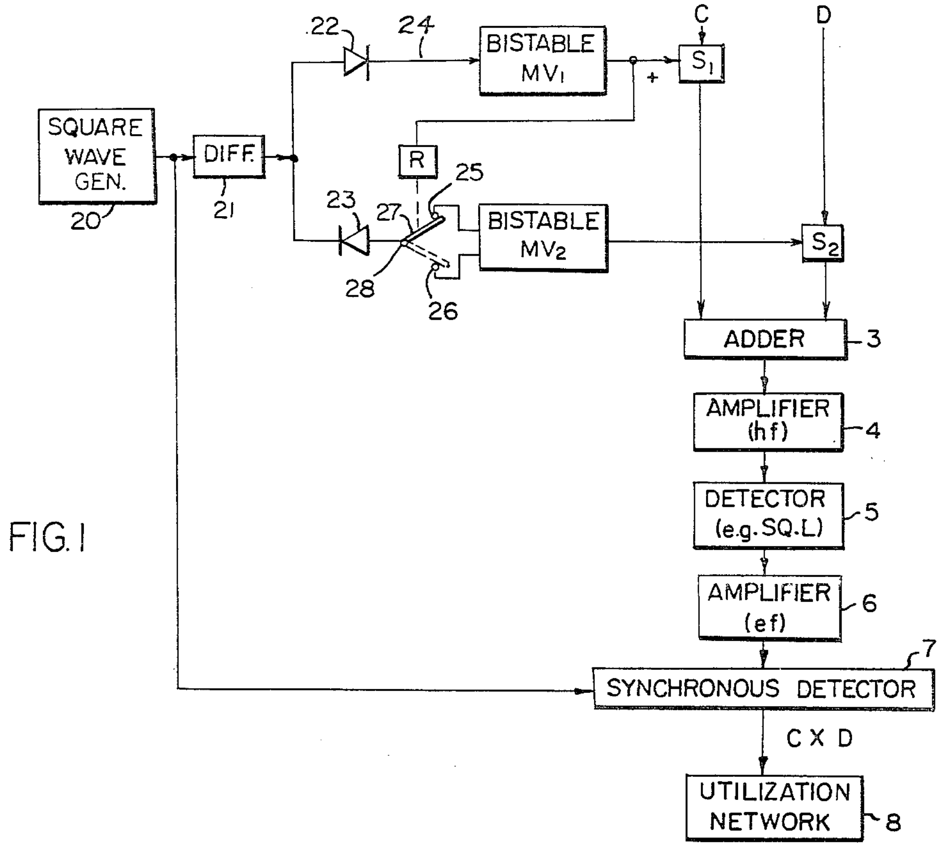
FIG. 1 is a schematic circuit diagram showing a first embodiment of the invention.

Referring now to the drawings two signals, designated C and D to be multiplied together are applied to the input terminals of respective switches $S_1$ and $S_2$. Each of these switches has two conditions. In the first condition it passes the signal applied to it without change. In the second condition it passes the signal with inverted polarity. These switches are preferably operated in square wave fashion, the operations of each being in time quadrature with the operations of the other. Thus the full cycle of operations of the two switches taken together is constituted of four quarters. In the first quarter of the cycle both of the signals C and D are passed through the switches $S_1$, $S_2$ without change. In the second quarter C is passed without change while D is passed with inverted polarity. In the third quarter, D continues to be passed with inverted polarity. In the third quarter, D continues to be passed with inverted polarity and C is now also passed with inverted polarity. In the fourth quarter of the cycle, C continuing to be passed with inverted polarity, the switch $S_2$ is restored to its initial condition and D is passed without change of polarity.

The cycle is now complete and each ensuing full cycle is an exact repetition of the first.

These polarity changes of the signals C and D are illustrated in the third and fourth curves, G. H, respectively, of FIG. 3, from an inspection of which it will readily be seen that the full cycle is constituted of the four consecutive quarters described above. The description of just how these polarity changes are effected, at the correct frequencies and with the correct phase relations will be postponed for the present.

The signals C and D, switched in the fashion described above, are now combined in a summing or adding device 3. Advantageously, though by no means essentially, the output of the adding device 3 is magnified by a high frequency amplifier 4 whose output, in turn, is applied to a detector 5, e.g., a peak detector, a linear detector, or a square law detector, whose function is to rectify the oscillatory radio-frequency signal and to filter out the high-frequency components in the rectified signal. The filtering or integration which is included in the detector circuit does not, however, remove all fluctuations. In particular, the low-frequency fluctuations associated with the switching are retained, together with the fluctuations representing changes in the power levels of the signals C and D, which in turn are related to changes in the power levels of the input signals A and B. The output of the detector 5, which contains the low frequency components of principal interest, is advantageously, though not essentially, magnified in amplitude by a low frequency amplifier 6 whose output is in turn applied to a synchronous detector 7 which may include conventional filters and the like.

Figure 4:
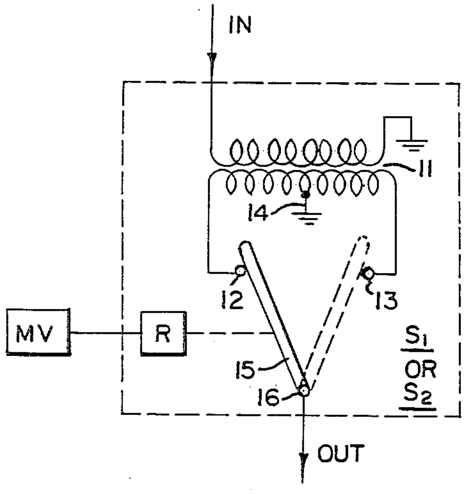
FIG. 4 is a schematic circuit diagram illustrating a possible construction for either of the principal switches of FIGS. 1 and 2.

The actual construction of either of the switches $S_1$, $S_2$ may take various forms. One that is suitable at many frequencies, and of which the mode of operation is evident is shown schematically in FIG. 4. The incoming signal, e.g., C or D, is applied to one terminal of the primary winding of a transformer 11 of which the other terminal is connected to ground. The end terminals of the secondary winding of the transformer 11 are connected, respectively, to contact points 12, 13 and a center tap 14 of the secondary winding is grounded. A movable arm 15, connected permanently to a third point 16 in such a way as to swing about this third point, makes contact under one condition with the contact point 12 and under the other condition with the contact point 13, thus to conduct current from one secondary end terminal or from the other secondary end terminal to the common terminal 16. The movable arm 15 is moved from one of the points 12, 13 to the other, e.g., by a relay R, in response to the output voltage of the multivibrator which controls the switch: $MV_1$ for $S_1$ and $MV_2$ for $S_2$. Evidently, the incoming signal, C or D, is passed in one phase to the common terminal 16 under one condition and in the opposite phase under the other condition. Structures more suitable for higher frequencies and having the same functional operation are well known.

The synchronous detector 7 is controlled by a square wave having precisely twice the frequency of either of the switch control waves G, H and a preassigned phase relation to them, to be described below. The output of the synchronous detector 7, as thus square wave-modulated, contains as a major component the product of the signal C by the signal D. This is applied to a utilization network 8 of any desired sort.

Returning, now, to the manner in which the several waves required for operation of the switches $S_1$ and $S_2$ and of the synchronous detector 7 are developed, this may be approached in various ways. A simple and convenient one, however, and of which the essential apparatus components are shown in FIG. 1, is to start with the generation of the square wave which controls the synchronous detector 7. Hence the first apparatus component at the upper left hand part of the drawing is a square wave generator 20. While this can be of any desired construction, a convenient and common approach is to start with a highly stable sine wave oscillator of the required frequency stabilized, for example, by a piezoelectric crystal. The output of this oscillator can be amplified, sliced, again amplified and again sliced as often as need be to develop a wave having exactly the frequency determined by the piezoelectric crystal, and sides which rise and fall with a high degree of abruptness to, and not beyond, preassigned voltages. While these voltages may be of any convenient magnitudes, they are selected, to simplify the exposition of the invention, as being one volt, positive or negative. Thus, referring again to FIG. 3, curve E which shows the output of the square wave generator 20 alternates between the magnitudes of plus one volt and minus one volt, shifting practically instantaneously from one of these magnitudes to the other.

The output of the square wave generator 20 is passed through a differentiator 21 which converts each rising side of the square wave E into a positive spike and each falling side into a negative spike. The sequence of spikes of alternately positive and negative excursions is shown in Curve F of FIG. 3. Again, by means well known in the art, the magnitude of each spike may be selected to suit circumstances and is shown in the drawing as being plus one volt for the positive going spikes and minus one volt for the negative ones. This is merely to facilitate the exposition.

The output terminal of the differentiator 21 is connected in parallel to two energy paths. The upper path includes a rectifier 22 so poled as to pass only the positive spikes to a first bistable multivibrator $MV_1$. Similarly, the lower path includes a rectifier 23 of the same construction but oppositely poled so as to pass only the negative going spikes to a second bistable multivibrator $MV_2$.

One of the two bistable multivibrators, illustratively, $MV_1$, may be of the common type in which each incoming pulse reaching its single input terminal 24 is applied simultaneously and in parallel to two (internal) control points. Thus, when it is in its OFF state, its output being minus one volt, the arrival of a positive spike from the differentiator 21 drives it to its ON state, to deliver an output of plus one volt. Similarly, when it is in its ON state, its output being plus one volt, the arrival of a positive spike from the differentiator 21 drives it to its OFF state, to deliver an output of minus one volt.

The other bistable multivibrator, illustratively, $MV_2$, differs. This multivibrator should be of the type, also well known in the art, in which incoming driving pulses are applied to one or to the other of two distinct control points, illustrated in the figure by the two input terminals 25, 26. In the present case, when an incoming spike, negative-going because of the rectifier 23, is applied to the first input terminal, illustratively the upper terminal 25 then, if the multivibrator $MV_2$ is in its ON state this pulse drives it to its OFF state. If the multivibrator $MV_2$ is already in its OFF state this incoming pulse is ineffective to alter the state of the multivibrator. Similarly, if a driving pulse is applied to the other input terminal 26 while the multivibrator $MV_2$ is in its OFF state, the pulse acts to drive it to its ON state; but if already in its ON state the driving pulse is ineffective to alter it.

Figure 3:
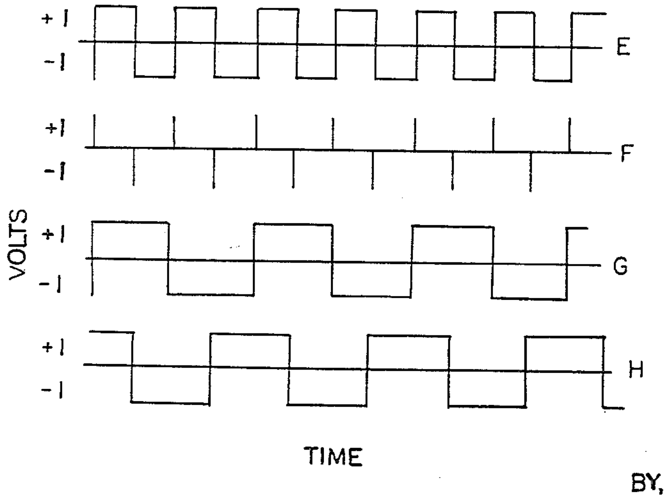
FIG. 3 is a group of waveform diagrams of assistance in explaining the mode of operation of the invention.

The correct phasing of the operations of switches $S_1$ and $S_2$ as shown in FIG. 3 and as described above can be insured in various ways of which the figure shows a particularly simple one; namely, a control path extending from the output terminal of the multivibrator $MV_1$ to a relay R which controls the operation of a routing switch in the lower path. When the upper multivibrator $MV_1$ is in its ON state, that is to say when its output is plus one volt, the output of $MV_1$ swings the conducting element of the switch shown, for expository purposes only, as a mechanical arm 27, to the position shown in solid lines to establish a connection from the rectifier 23 to the upper input terminal 25. In this position of the arm 27 the next pulse incoming to the center point 28 of the routing switch will either drive the multivibrator $MV_2$ from its ON state to its OFF state or, if already in its OFF state, leave it there. Similarly, when the multivibrator $MV_1$ returns to its OFF state, represented by a negative output voltage, the control signal applied through the relay R to the movable arm 27 of the routing switch shifts it to the position shown in broken lines, in which case the next driving pulse to arrive in the lower path reaches the lower input point 26 of the bistable multivibrator $MV_2$ and drives it to its ON state represented by a positive output voltage.

With the foregoing sequence of events, the signals which, after summing and, provided the detector is of the square law variety, reach the synchronous detector in the four consecutive quarter cycles are:

First quarter: $|C+D|^2=|C|^2+2\overline{C\cdot D}+|D|^2$

Second quarter: $|C-D|^2=|C|^2-2\overline{C\cdot D}+|D|^2$

Third quarter: $|-C-D|^2=|C|^2+2\overline{C\cdot D}+|D|^2$

Fourth quarter: $|-C+D|^2=|C|^2-2\overline{C\cdot D}+|D|^2$

With the phase relations described above, the square wave output voltage of the synchronous detector inverts the polarities of the second of these squares and of the fourth, leaving the first and the third unchanged. In practice, the switching frequency is chosen sufficiently high that there is little or no change in the average value of $|C|^2$ or of $|D|^2$ from one quarter cycle to the next. Also, the synchronous detector will in practice incorporate a low-pass filter or integrator which has the effect of adding together the contributions from each of the quarter cycles, after the polarity inversions just described. Evidently, the effect of the polarity inversions and the summations carried out in the synchronous detector is tto balance out the $|C|^2$ terms and the $|D|^2$ terms to leave, as the final sum, only $8\,\overline{C\cdot D}$.

The groundwork has now been laid for an explanation of the manner in which, and the extent to which, the invention accomplishes its started purposes. This explanation is given in terms of a randomly selected example. Almost any other example would serve as well.

Suppose, for example, that the switches $S_1$ and $S_2$, instead of modulating the incoming signals C and D by square waves of exactly unit amplitude, positive and negative, deliver, for the switch $S_1$, amplitudes G of $+1.01$ and $-0.99$ and, for the switch $S_2$, amplitudes H of $+1.02$ and $-0.98$. Aside from differences among constants of proportionality, which are of no interest, one half the sum of the products in the first quarter cycle when the waves G and H are both positive and in the third quarter cycle when they are both negative, the wave E being positive in each case, is $$\tfrac{1}{2}[(1.01)\times(1.02)+(-0.99)\times(-0.98)]=1.0002$$

Similarly, one half the sum of the products in the second and fourth quarter cycles, when the waves G and H are of opposite polarities, the wave E being in each case negative, is $$-\tfrac{1}{2}[(1.01)\times(-0.98)+(-0.99)\times(1.02)]=0.9998$$

Evidently, each of the numbers to the right of the "equals" signs is very much closer to unity than any of the four different wave amplitudes from which it is developed.

Figure 2:
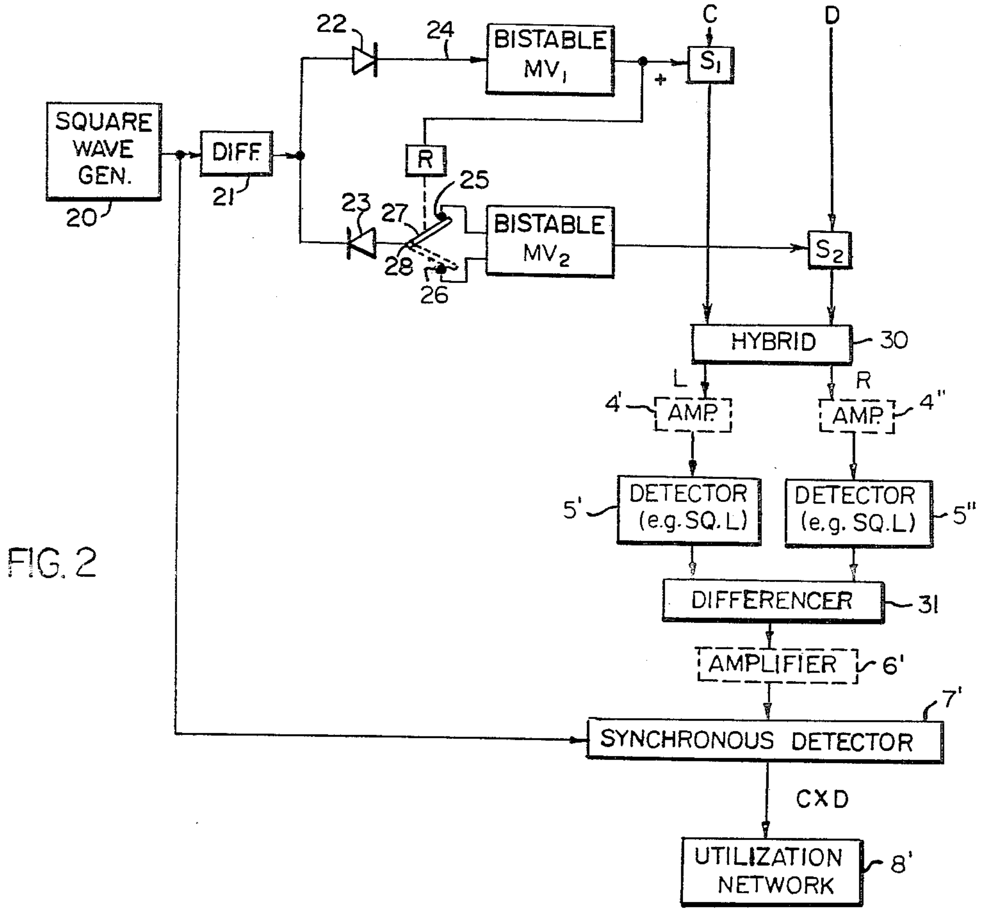
FIG. 2 is a schematic circuit diagram showing a second embodiment of the invention.

FIG. 2 shows a second modification of the invention in which the square wave generator 20, the differentiator 21, the rectifiers 22, 23, the bistable multivibrators $MV_1$, $MV_2$, the switches $S_1$ and $S_2$ and the routing switch and its control are the same as in FIG. 1. In FIG. 2, however, the switched signals, instead of being applied immediately to an adder are applied to the two input points of a biconjugate network, for example, a Hybrid 30. As is well known and as shown, for example, in Clapp Patent No. 3,017,505 it is a property of such a network that, two signals being applied to its two inputs points, their sum appears at one of its two output points and their difference appears at the other output point. After such amplification as may be deemed necessary (and this is optional as indicated by the amplifier 4' shown in broken lines) the sum of the switched signals C, D is applied to a first detector 5'. Similarly, the difference between the two switched signals is applied to a second detector 5''. The outputs of these two detectors are in turn applied to a subtractor unit 31 which forms the difference of the two detected outputs. This difference contains the low frequency components of principal interest. After such magnification as may be considered desirable by an amplifier 6', the resulting difference is applied to a synchronous detector 7' which operates under control of the output of the square wave generator 20 exactly as in the case of the apparatus of FIG. 1. The output of the synchronous detector 7' contains, as a major constituent, the product of the signal C by the signal D and this product is applied to a utilization network 8'.

In the foregoing analysis, square law detection was assumed. An analysis that is broadly similar, differing only in algebraic and numerical detail, shows that the invention accomplishes its stated objects independently of the type of detector employed, provided that a feedback loop is utilized to alter B in such a way as to maintain $\overline{C\cdot D}$ very close to zero. Furthermore, and aside from the type of detection employed, an analysis similar to that set forth above shows that the invention reduces the influences on the final product of errors of phasing or timing. An explanation identical with the explanation given above for FIG. 1, albeit complicated by reason of the greater number of terms involved, establishes that the apparatus of FIG. 2 serves the stated purposes of the invention just as does that of FIG. 1, and in the same way. The apparatus of FIG. 2 operates in accordance with the same principles as that of FIG. 1 with the additional advantage that all incoming information is conserved.

Moreover, the errors thus reduced originate, not solely in departures from ideal performance of the switcthes $S_1$ and $S_2$, but rather in departures from the ideal of any of the several apparatus elements that are connected in cascade: rectifiers, multivibrators, amplifiers, the summing device 3 and the detector 5 of FIG. 1, and in the case of FIG. 2, those of the detectors 5', 5'', the Hybrid 30 and the differencer 31 as well. In short, the only apparatus component whose performance is not thus improved is the synchronous detector itself; and because of the ready availability of crystals, slicers and amplifiers of high quality, it is not difficult to construct a synchronous detector whose performance approximates the ideal as closely as may be desired.

Modifications of and departures from the illustrative apparatus shown above and which are nevertheless embraced within the spirit and the teaching of the invention will suggest themselves to those versed in the art.

What is claimed is:

1. Apparatus for generating the averaged product of a first high-frequency signal and a second high-frequency signal which comprises means for periodically switching the first high-frequency signal between two conditions that are nominally of equal magnitudes and opposite polarities at a first switching frequency which is substantially lower than either high-frequency signal frequency to provide a first switched output, means for similarly switching the second high frequency signal between two conditions that are nominally of equal magnitudes and opposite polarities at said first switching frequency, means causing the last named switching operations to take place in time quadrature with the first named switching operations, means for combining said first and second switched outputs, means for conventionally detecting the first and second switched outputs as thus combined, means for generating a modulating wave of twice said first switching frequency, a synchronous detector having two input terminals and an output terminal, connections for applying said combined and detected switched outputs to one of said input terminals, and means for applying said modulating wave to the other of said input terminals, whereby said averaged product is developed at said output terminal with minimal degradation by imperfections of the elements of said apparatus.

2. Apparatus as defined in claim 1 wherein the equal and opposite conditions of the second named switching means are the same as those of said first named switching means.

3. In combination with apparatus as defined in claim 1, a first bistable device connected to control the first switching means, and a second bistable device connected to control the second switching means.

4. Apparatus as defined in claim 3 wherein the first bistable device is provided with a single input terminal and is constructed to respond by a change of state to each pulse applied to said single input terminal.

5. Apparatus as defined in claim 4 wherein the second bistable device is provided with two input terminals and is constructed to respond, by shifting from a first state to a second state, only to a pulse applied to one of said input terminals and to respond, by shifting from said second state to said first state, only to a pulse applied to said second input terminal.

6. In combination with apparatus as defined in claim 5, a routing switch having an input terminal, a control point and two output terminals for selectively directing pulses applied to said input terminal to one or to the other of the input terminals of the second bistable device as determined by a signal condition applied to said control point, and a control path extending from the output terminal of the first bistable device to the control point of said routing switch.

7. Apparatus as defined in claim 1 wherein the output-input characteristic of said detecting means obeys a square law.

8. Apparatus as defined in claim 1 wherein the signal combining means comprises an adding device.

9. Apparatus as defined in claim 1 wherein the switched output combining means comprises an adding device and a subtracting device giving respectively a sum signal and a difference signal each of which is then detected to give respectively a rectified sum signal and a rectified difference signal, and means to detect synchronously said rectified sum and difference signals.

10. Apparatus as defined in claim 9 including a difference device having first and second input terminals and an output terminal, means to apply the rectified sum signal to the first difference device input terminal, means to apply the rectified difference signal to the second difference device input terminal, a synchronous detector having first and second input terminals, and means connecting the output terminal of said difference device to one of the input terminals of said synchronous detector.

References Cited

UNITED STATES PATENTS

| | | | |
|---|---|---|---|
| 2,805,021 | 9/1957 | Weibel | 235—194 |
| 2,906,459 | 9/1959 | Lovell | 235—194 |

FOREIGN PATENTS

| | | |
|---|---|---|
| 715,344 | 9/1954 | Great Britain. |

DONALD D. FORRER, Primary Examiner
JOHN ZAZWORSKY, Assistant Examiner

U.S. Cl. X.R.

235—194